US 12,509,316 B2

(12) United States Patent
Mikami et al.

(10) Patent No.: US 12,509,316 B2
(45) Date of Patent: Dec. 30, 2025

(54) SHEET CONVEYING APPARATUS

(71) Applicant: Prime Planet Energy & Solutions, Inc., Tokyo (JP)

(72) Inventors: Masateru Mikami, Himeji (JP); Takahiro Matsushita, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 44 days.

(21) Appl. No.: 18/433,410

(22) Filed: Feb. 6, 2024

(65) Prior Publication Data

US 2024/0279013 A1 Aug. 22, 2024

(30) Foreign Application Priority Data

Feb. 17, 2023 (JP) ................................. 2023-023553

(51) Int. Cl.
*B65H 9/00* (2006.01)
*B65H 5/22* (2006.01)

(52) U.S. Cl.
CPC ............ *B65H 9/002* (2013.01); *B65H 5/228* (2013.01); *B65H 2301/333* (2013.01); *B65H 2406/122* (2013.01)

(58) Field of Classification Search
CPC ...................... B65H 2801/72; B65H 2701/173
See application file for complete search history.

(56) References Cited

U.S. PATENT DOCUMENTS

2009/0110809 A1   4/2009   Buschbeck

FOREIGN PATENT DOCUMENTS

| JP | H06340360 A | 12/1994 |
|---|---|---|
| JP | 2009242021 A | 10/2009 |
| JP | 2010-149963 A | 7/2010 |
| JP | 2010-182621 A | 8/2010 |
| JP | 2010-225467 A | 10/2010 |
| JP | 2010269889 A | 12/2010 |
| JP | 2011500480 A | 1/2011 |
| JP | 2011162280 A | 8/2011 |
| JP | 2017-098029 A | 6/2017 |
| JP | 2017-228349 A | 12/2017 |
| JP | 2021046309 A | 3/2021 |

(Continued)

OTHER PUBLICATIONS

Translation of JP-2023003004-A (Year: 2025).*

*Primary Examiner* — Howard J Sanders
(74) *Attorney, Agent, or Firm* — HAUPTMAN HAM, LLP

(57) ABSTRACT

A sheet conveying apparatus includes: a first conveying portion in which a band-shaped sheet including a first surface and a second surface is conveyed with the first surface facing downward; a turning portion located downstream of the first conveying portion and flips the sheet with the first surface facing inward; and a second conveying portion located downstream of the turning portion. The turning portion includes a convex curve along which the sheet is flipped. The convex curve includes a first and a second air ejection portions. The first air ejection portion is located in an upstream end region and ejects air toward the first surface of the sheet. The second air ejection portion is located downstream of the upstream end region and ejects air toward the first surface. The first air ejection portion ejects air to generate flotation larger than that of the second air ejection portion.

10 Claims, 3 Drawing Sheets

(56) References Cited

FOREIGN PATENT DOCUMENTS

| JP | 2023003004 A | * | 1/2023 |
| JP | 2023047903 A | | 4/2023 |
| WO | 2010/089664 A1 | | 8/2010 |

* cited by examiner

SHEET CONVEYING APPARATUS

CROSS-REFERENCE TO RELATED APPLICATIONS

This application claims the benefit of priority to Japanese Patent Application No. 2023-023553 filed on Feb. 17, 2023. The entire contents of this application are hereby incorporated herein by reference.

BACKGROUND

The present disclosure relates to a sheet conveying apparatus.

Japanese Patent Application Publication No. 2010-149963, for example, discloses a web conveying apparatus in which a web provided with a coating film by a coater is conveyed to pass through a drier. In the conveying apparatus of Japanese Patent Application Publication No. 2010-149963, a conveying path of the web is configured such that the web travels upward and then turns around two turn rolls and travels downward. The turn rolls have a large number of holes through which air is brown to raise the web. Japanese Patent Application Publication No. 2010-149963 shows that the web rises from the turn rolls by ejecting air from the holes in the turn rolls and is conveyed while being supported in a floating state. Accordingly, damage of the undried coated surface of the web can be prevented or reduced.

In addition, Japanese Patent Application Publication No. 2010-182621, for example, discloses an electrode fabrication apparatus including a plurality of electrode conveying sections in which band-shaped electrode foil provided with a coated layer is conveyed. The electrode conveying sections are aligned in the top-bottom directions and each extend substantially horizontally. A pair of upper and lower turning rollers is provided between the electrode conveying sections.

SUMMARY

In the sheet conveying apparatus described in Japanese Patent Application Publication No. 2010-182621, a sheet is conveyed substantially horizontally and then is flipped in such a manner that a turning portion provided with a turning roller is wound in a longitudinal direction. In such a sheet conveying apparatus, for example, if sufficient flotation for floating a sheet at an entry of the turning portion is not obtained, the sheet might contact the turning portion. Proposed herein is a sheet conveying apparatus in which a sheet does not easily contact a turning portion for flipping a sheet.

A sheet conveying apparatus proposed here includes a first conveying portion, a turning portion, and a second conveying portion. In the first conveying portion, a band-shaped sheet including a first surface and a second surface on an opposite side of the first surface is conveyed with the first surface facing downward. The turning portion is located downstream of the first conveying portion and configured to flip the sheet with the first surface facing inward such that the second surface is located below the first surface. The second conveying portion is located downstream of the turning portion and configured to convey the sheet with the second surface facing downward. The first conveying portion includes an air nozzle that ejects air toward the first surface of the sheet, and the sheet being allowed to float by the ejected air. The turning portion includes a convex curve along which the sheet is flipped. The convex curve includes a first air ejection portion and a second air ejection portion, the first air ejection portion being located in an upstream end region of the convex curve and configured to eject air toward the first surface of the sheet, the second air ejection portion being located downstream of the upstream end region of the convex curve and configured to eject air toward the first surface of the sheet. The first air ejection portion ejects air to generate flotation larger than that of the second air ejection portion.

In the sheet conveying apparatus, flotation of air ejected from the first air ejection portion in the upstream end region of the convex curve is larger than that from the second air ejection portion in the downstream region. Accordingly, the sheet does not easily contact the upstream end region of the convex curve. As a result, the sheet does not easily contact the turning portion.

DETAILED DESCRIPTION

Figure 1:
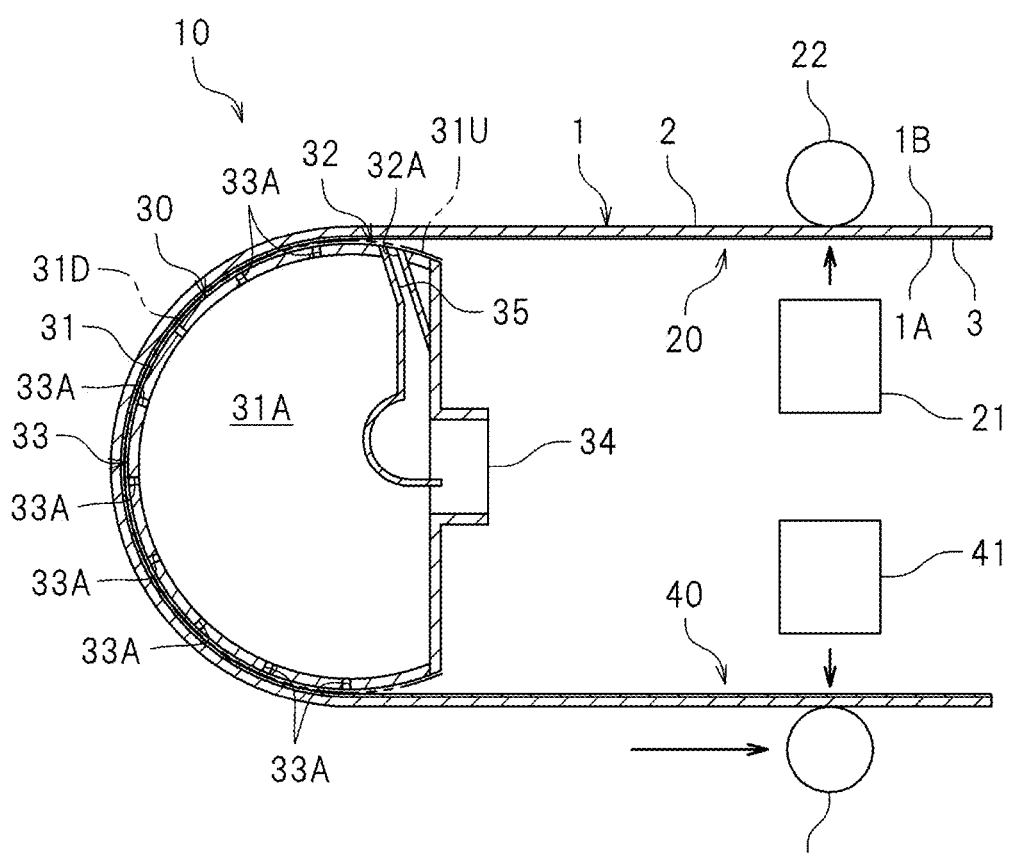
FIG. 1 is a schematic cross-sectional view of a sheet conveying apparatus.

A preferred embodiment of a sheet conveying apparatus will be described hereinafter. The preferred embodiment described herein is, of course, not intended to particularly limit the present invention. Each drawing is a schematic view and does not necessarily strictly reflect an actual product. Members and portions having the same functions are denoted by the same reference characters, and description for the same elements and features will not be repeated or will be simplified as appropriate.

Configuration of Sheet Conveying Apparatus

FIG. 1 is a schematic cross-sectional view of a sheet conveying apparatus 10. The sheet conveying apparatus 10 conveys an electrode sheet 1 of a battery. The term "battery" herein refers to a general electric storage device from which electric energy can be extracted, and is a concept including a primary battery and a secondary battery as well as a chemical battery such as a lithium ion secondary battery or a nickel-metal hydride battery and a physical battery such as an electric double layer capacitor.

As illustrated in FIG. 1, the sheet conveying apparatus 10 is configured such that the electrode sheet 1 is flipped during conveyance. In the electrode sheet 1, a surface of the electrode foil 2 is coated with a coating material 3. The electrode sheet 1 has a band shape. The electrode sheet 1 includes a coated surface 1A coated with the coating material 3 including an active material and an uncoated surface 1B on an opposite side of the coated surface 1A. In this embodiment, the illustrated portion of the sheet conveying apparatus 10 is used for conveying the electrode sheet 1 in which the coating material 3 has not been dried yet. It should be noted that the illustrated portion of the sheet conveying apparatus 10 may be used for conveying the electrode sheet 1 in which the coating material 3 is dried.

As illustrated in FIG. 1, the sheet conveying apparatus 10 includes a first conveying portion 20 in which the electrode sheet 1 is conveyed, a turning portion 30 located downstream of the first conveying portion 20, and a second conveying portion 40 located downstream of the turning portion 30. In this embodiment, the first conveying portion 20 and the second conveying portion 40 are oriented substantially horizontally. In the first conveying portion 20, the electrode sheet 1 is conveyed with the coated surface 1A facing downward. In the turning portion 30, the electrode sheet 1 is flipped with the coated surface 1A facing inward such that the uncoated surface 1B faces downward. The conveying path of the electrode sheet 1 in the turning portion 30 extends in a direction including the top-bottom directions. In the second conveying portion 40, the electrode sheet 1 is conveyed with the uncoated surface 1B facing downward. The second conveying portion 40 is located below the first conveying portion 20.

The first conveying portion 20 includes an upstream air nozzle 21 that ejects air toward the coated surface 1A of the electrode sheet 1. The first conveying portion 20 is configured to enable floating of the electrode sheet 1 by the ejected air. This prevents the undried (or dried) coating material 3 from contacting the sheet conveying apparatus 10 to cause separation of the coating material 3 or other troubles. The upstream air nozzle 21 is located below the conveying path of the electrode sheet 1 in the first conveying portion 20 and ejects air upward. An upstream conveying roller 22 is disposed above the conveying path of the electrode sheet 1 in the first conveying portion 20. The upstream conveying roller 22 contacts the uncoated surface 1B of the electrode sheet 1 and conveys the electrode sheet 1 downstream.

In this preferred embodiment, the upstream air nozzle 21 also serves as a nozzle that ejects air for drying the coating material 3. In this preferred embodiment, the electrode sheet 1 is dried while being conveyed by the sheet conveying apparatus 10. The sheet conveying apparatus 10 may convey the electrode sheet 1 with the undried coating material 3 to a drier provided separately from the sheet conveying apparatus 10.

The turning portion 30 includes a convex curve 31 along which the electrode sheet 1 is flipped. The "flipping (flipped)" herein refers to turning of the electrode sheet 1 such that the upper surface and the lower surface are switched. As illustrated in FIG. 1, the convex curve 31 has an arc shape in a cross section in this embodiment. The convex curve 31 may have another curved shape along which the electrode sheet 1 can be flipped. The convex curve 31 includes a first air ejection portion 32 located in an upstream end region 31U and configured to eject air toward the coated surface 1A of the electrode sheet 1 and a second air ejection portion 33 located in a downstream region 31D downstream of the upstream end region 31U and configured to eject air toward the coated surface 1A of the electrode sheet 1. The air ejected from the first air ejection portion 32 and the second air ejection portion 33 cause the electrode sheet 1 to float away from the convex curve 31. The electrode sheet 1 is conveyed while being separated from the convex curve 31 and is flipped by conveyance along the convex curve 31. In this preferred embodiment, the first air ejection portion 32 ejects air to generate larger flotation than the second air ejection portion 33. The turning portion 30 will be described in detail later.

The second conveying portion 40 includes a downstream air nozzle 41 that ejects air toward the coated surface 1A of the electrode sheet 1. The downstream air nozzle 41 is located above the conveying path of the electrode sheet 1 in the second conveying portion 40 and ejects air downward. In the second conveying portion 40, the electrode sheet 1 is conveyed with the coated surface 1A facing upward. A downstream conveying roller 42 is disposed below the conveying path of the electrode sheet 1 in the second conveying portion 40. The downstream conveying roller 42 contacts the uncoated surface 1B as the lower surface of the electrode sheet 1 and conveys the electrode sheet 1 downstream.

Configuration of Turning Portion

Figure 2:
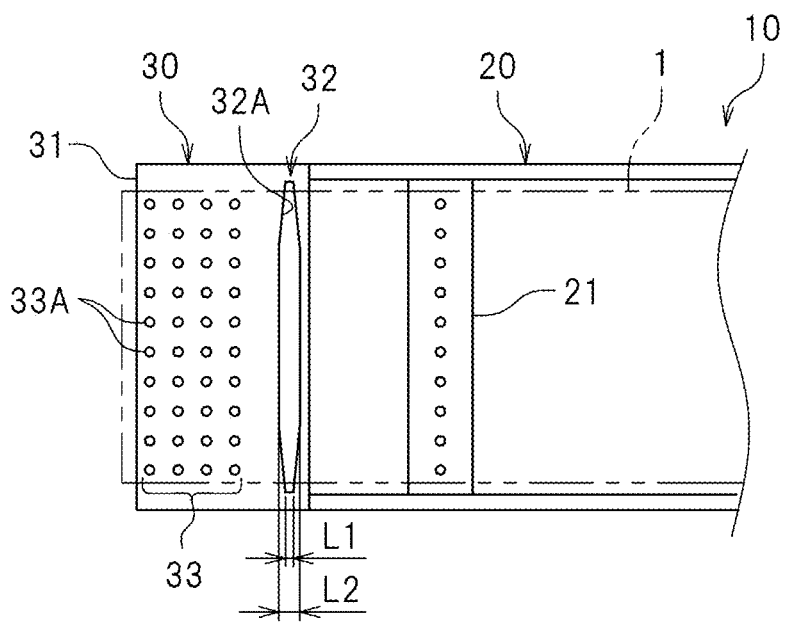
FIG. 2 is a schematic plan view of the sheet conveying apparatus.

As illustrated in FIG. 1, the turning portion 30 is formed with a hollow interior and includes an internal space 31A. FIG. 2 is a schematic plan view of the sheet conveying apparatus 10. As illustrated in FIG. 2, the first air ejection portion 32 is constituted by a slit 32A formed in the convex curve 31 and extending in the width direction of the electrode sheet 1. As illustrated in FIG. 1, the internal space 31A and the slit 32A communicate with each other. The second air ejection portion 33 is constituted by a plurality of air ejection holes 33A formed in the convex curve 31. The internal space 31A communicates with the air ejection holes 33A. An aperture ratio of the first air ejection portion 32 constituted by the slit 32A is larger than an aperture ratio of the second air ejection portion 33 constituted by the air ejection holes 33A. In this preferred embodiment, the larger aperture ratio make flotation by air ejected from the first air ejection portion 32 larger than that from the second air ejection portion 33.

As illustrated in FIG. 1, the turning portion 30 includes an air inlet 34 through which air is introduced into the internal space 31A. The air inlet 34 is connected to an unillustrated air supply fan. Air supplied from the air inlet 34 to the internal space 31A by the air supply fan is ejected from the slit 32A of the first air ejection portion 32 and the air ejection holes 33A of the second air ejection portion 33. The air may be supplied not by the air supply fan but an air compressor for generating compressed air, for example.

As illustrated in FIG. 1, the turning portion 30 includes a straightening vane 35 disposed in the internal space 31A and configured to guide air such that the air flows toward the slit 32A. The straightening vane 35 causes an air pressure near the slit 32A to increase, and as a result, the flow rate and the pressure of air ejected from the slit 32A increase. The straightening vane 35 can also make flotation by air ejected from the first air ejection portion 32 larger than that from the second air ejection portion 33. A lower end of the straightening vane 35 is located near the air inlet 34 and covers an upper portion of the air inlet 34 in a side view. Accordingly, a part of air supplied to the air inlet 34 is guided to the slit 32A so that the flow rate and the pressure of air ejected from the slit 32A increase. In this preferred embodiment, the lower end of the straightening vane 35 extends to a position below a half of the air inlet 34 in a side view. The position of the lower end of the straightening vane 35 is not particularly limited, and the lower end of the straightening vane 35 may be located above the half of the air inlet 34. An upper end of the straightening vane 35 is located near the slit 32A and tilts to the downstream side in the conveyance direction of the electrode sheet 1 with respect to the vertical direction. The vertical direction herein refers to a direction orthogonal to a conveyance direction and the width direction of the electrode sheet 1. Accordingly, air ejected from the slit 32A is ejected obliquely upward toward the downstream side in the conveyance direction of the electrode sheet 1. An angle of the upper end of the straightening vane 35 to the vertical direction is preferably 10 degrees or more and 45 degrees or less. More preferably, the angle of the upper end of the straightening vane 35 to the vertical direction is 10 degrees or more and 20 degrees or less.

As illustrated in FIG. 2, a length of the slit 32A in the width direction of the electrode sheet 1 is larger than a length of the electrode sheet 1 in the width direction. A width of the slit 32A in the conveyance direction of the electrode sheet 1 is larger in a center portion than in an end portion in the width direction. In this preferred embodiment, the slit 32A has a flat octagon shape elongated in the width direction of the electrode sheet 1 in a plan view. The shape of the slit 32A is not particularly limited, and may be a hexagon, a rhombus, a rectangle, an elongated hole whose end portion in the width direction of the electrode sheet 1 is substantially a circle, or an oval, for example. The width of the slit 32A in the conveyance direction of the electrode sheet 1 may be uniform, irrespective of the position in the width direction of the electrode sheet 1. The width of the slit 32A in the conveyance direction of the electrode sheet 1 is preferably 0.2 mm or more and 2 mm or less. The width of the slit 32A in the conveyance direction of the electrode sheet 1 is preferably 0.4 mm or more and 1 mm or less in an end portion in the width direction (indicated by L1 in FIG. 2), and is preferably 0.6 mm or more and 2 mm or less in a center portion in the width direction (indicated by L2 in FIG. 2).

As illustrated in FIG. 1, the convex curve 31 having an arc shape in a cross section extends from the upper vertex to the upstream side in the conveyance direction of the electrode sheet 1. The first air ejection portion 32 is located upstream in the conveyance direction of the upper vertex of the convex curve 31. Preferably, the first air ejection portion 32 is located at a position within 15 degrees upstream in the conveyance direction from the upper vertex of the convex curve 31. An angle of the slit 32A to the upper vertex of the convex curve 31 is more preferably 10 degrees or more and 15 degrees or less.

Advantages of Embodiments

Figure 3:
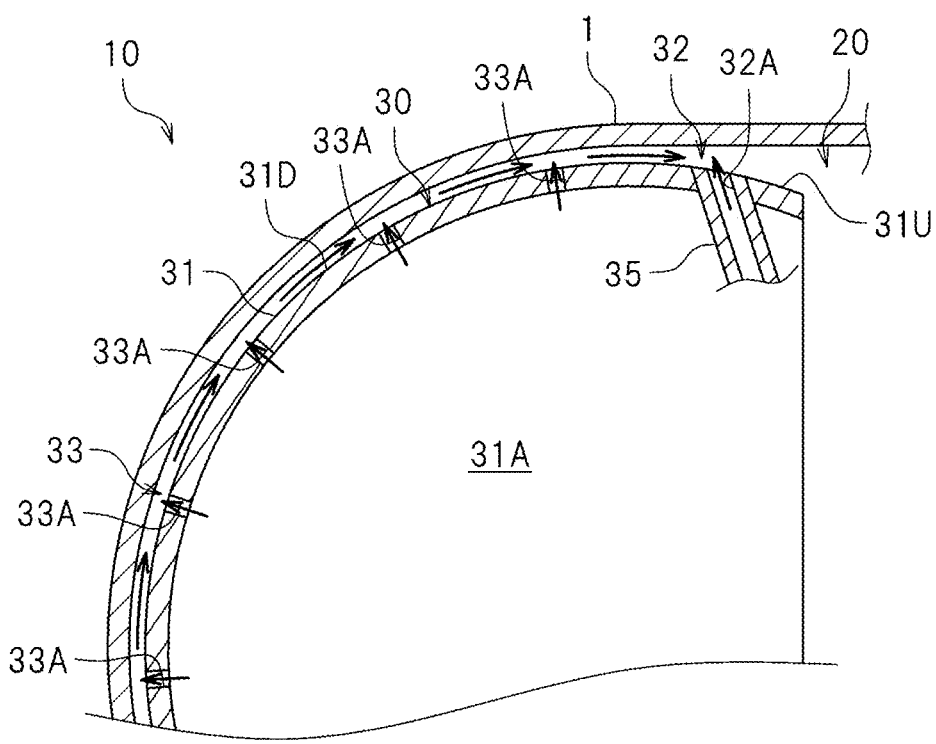
FIG. 3 is a schematic cross-sectional view of a turning portion showing a flow of air.
Figure 4:
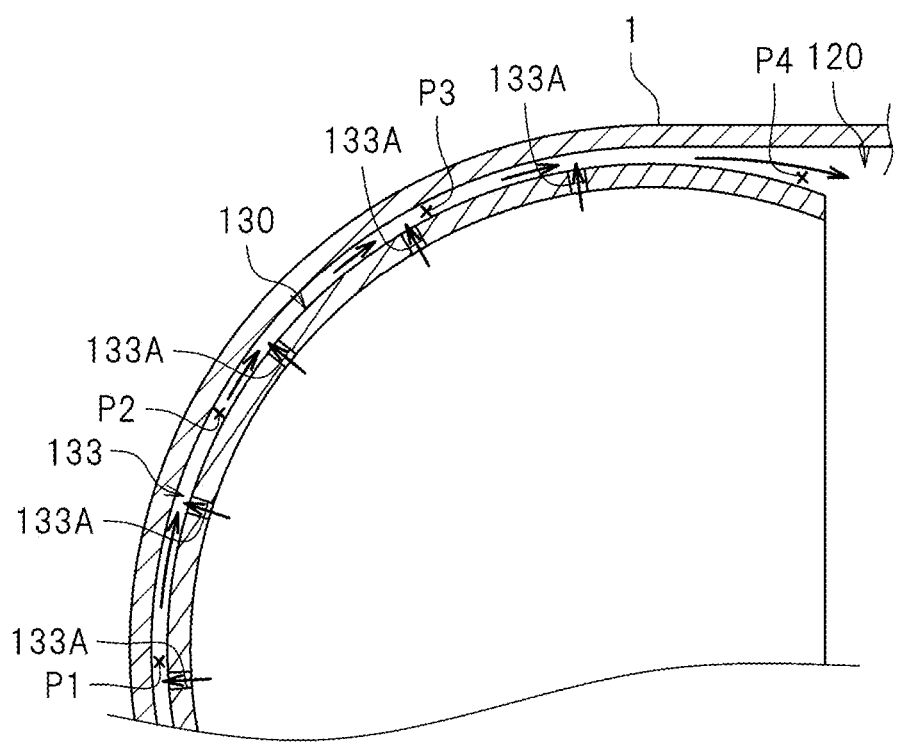
FIG. 4 is a schematic cross-sectional view of the turning portion showing a flow of air in the case of including no first air ejection portion.

A flow of air generated by the sheet conveying apparatus 10 according to this preferred embodiment and advantages thereof will be described below. FIG. 3 is a schematic cross-sectional view of the turning portion 30 showing a flow of air. FIG. 4 is a schematic cross-sectional view of a turning portion 130 showing a flow of air in the case of including no first air ejection portion 32. As illustrated in FIG. 4, in the turning portion 130 including no first air ejection portion 32, air is ejected only from air ejection holes 133A in the second air ejection portion 133. According to the findings of the inventors of the present application, as illustrated in FIG. 4, a part of the air ejected from the second air ejection portion 133 is emitted onto the first conveying portion 120 upstream of the turning portion 130 along a gap between the electrode sheet 1 and the turning portion 130. Such a flow of air reduces the pressure of air near the entry of the turning portion 130 close to the first conveying portion 120. According to the findings of the inventors, the air pressure is high at a point P1 along the turning portion 130, the air pressure at a point P2 upstream of the point P1 is lower than the air pressure at the point P1, and the air pressure at a point P3 upstream of the point P2 is lower than the air pressure at the point P2. Thus, a force for floating the electrode sheet 1 gradually decreases toward the entry of the turning portion 130, and the electrode sheet 1 easily contacts the turning portion 130 at a position near the entry of the turning portion 130.

Further, the inventor found that a negative pressure might occur between the electrode sheet 1 and the turning portion 130 at an upstream point P4 upstream in the conveyance direction from the upper vertex of the turning portion 130. Accordingly, the electrode sheet 1 more easily contacts the turning portion 130 near the entry of the turning portion 130.

On the other hand, as illustrated in FIG. 3, in this preferred embodiment, the convex curve 31 includes the first air ejection portion 32 disposed in the upstream end region 31U and the second air ejection portion 33 disposed in the downstream region 31D located downstream of the upstream end region 31U, and the first air ejection portion 32 ejects air to generate flotation larger than that of the second air ejection portion 33. Since the flotation of air ejected from the first air ejection portion 32 is larger than that from the second air ejection portion 33, flotation that gradually decreases toward the entry of the turning portion 30 in a conventional technique can be made larger near the entry of the turning portion 30. Accordingly, the electrode sheet 1 does not easily contact the upstream end region 31U in the convex curve 31. Consequently, the electrode sheet 1 does not easily contact the turning portion 30.

Air ejected from the first air ejection portion 32 hinders emission of air ejected from the second air ejection portion 33 onto the first conveying portion 20. Accordingly, a decrease in pressure between the electrode sheet 1 and the turning portion 30 can be suppressed. This also reduce contact of the electrode sheet 1 with the turning portion 30.

In this preferred embodiment, the first air ejection portion 32 includes the slit 32A formed in the convex curve 31 and extending in the width direction of the electrode sheet 1. On the other hand, the second air ejection portion 33 includes the air ejection holes 33A formed in the convex curve 31. With this configuration, the aperture ratio of the first air ejection portion 32 is larger than the aperture ratio of the second air ejection portion 33. Accordingly, flotation by air ejected from the first air ejection portion 32 can be made larger than flotation of air ejected from the second air ejection portion 33. In addition, since the first air ejection portion 32 includes the slit 32A, air can be continuously ejected from the first air ejection portion 32. Accordingly, the effect of hindering emission of air from the second air ejection portion 33 onto the first conveying portion 20 can be enhanced.

In this preferred embodiment, the length of the slit 32A in the width direction is larger than the length of the electrode sheet 1 in the width direction (see FIG. 2). Accordingly, the advantage of enhancing flotation of the electrode sheet 1 by air ejected from the first air ejection portion 32 can be obtained over the entire width direction of the electrode sheet 1.

Furthermore, in this preferred embodiment, the turning portion 30 includes the internal space 31A communicating with the slit 32A and the air ejection holes 33A, the air inlet 34 through which air is introduced into the internal space 31A, and the straightening vane 35 located in the internal space 31A and configured to guide air toward the slit 32A. As described above, the straightening vane 35 can increase the flow rate and the pressure of air ejected from the slit 32A. Accordingly, in the upstream end region 31U in the convex curve 31, a force for floating the electrode sheet 1 can be further increased.

Moreover, in this preferred embodiment, an end of the straightening vane 35 toward the slit 32A is tilted to the downstream side in the conveyance direction of the electrode sheet 1 with respect to the vertical direction. Accordingly, air from the first air ejection portion 32 is ejected in a direction tilted downstream in the conveyance direction of the electrode sheet 1. Accordingly, air is ejected from the first air ejection portion 32 toward the second air ejection portion 33, and thus, the advantage of hindering emission of air ejected from the second air ejection portion 33 onto the first conveying portion 20 is enhanced. As a result, the possibility of contact of the electrode sheet 1 with the turning portion 30 can be further reduced.

In this preferred embodiment, the width of the slit 32A in the conveyance direction of the electrode sheet 1 is larger in a center portion than in an end portion in the width direction (see FIG. 2). Accordingly, the amount of air ejected from the center portion of the slit 32A in the width direction increases. Air escapes to the outside more easily from an end portion of the slit 32A than the center portion of the slit 32A in the width direction. With this shape of the slit 32A, the amount of air in the center portion in the width direction from which air does not easily escape is increased, and the amount of air in the end portion in the width direction from which air easily escapes is reduced. As a result, the amount of air for floating the electrode sheet 1 can be increased.

The width of the slit 32A in the conveyance direction of the electrode sheet 1 is preferably 2 mm or less. The width of the slit 32A set at 2 mm or less can increase the pressure of air in the internal space 31A near the slit 32A. Accordingly, the pressure of air ejected from the slit 32A increases, and a force for floating the electrode sheet 1 can be kept large.

In this preferred embodiment, the first air ejection portion 32 is located upstream in the conveyance direction of the upper vertex of the convex curve 31. Accordingly, air ejected from the first air ejection portion 32 is supplied to an upstream portion (corresponding to P4 in FIG. 4) upstream of the upper vertex of the turning portion 30. In the upstream portion P4, the air pressure tends to be especially low and might be negative in a conventional technique. On the other hand, in this preferred embodiment, the air pressure in this upstream portion can be kept high, since air ejected from the first air ejection portion 32 is supplied to that upstream portion. When the first air ejection portion 32 is provided at or downstream of the upper vertex of the turning portion 30, a negative pressure occurs at an upstream side of the vertex, and flotation decreases as compared to the case of providing the first air ejection portion 32 upstream of the vertex.

The first air ejection portion 32 is preferably located at a position within 15 degrees upstream in the conveyance direction from the upper vertex of the convex curve 31. In a case where the angle of the first air ejection portion 32 with respect to the upper vertex of the convex curve 31 is large, a negative pressure is less likely to occur in the upstream side of the vertex, but the distance between the first air ejection portion 32 and the electrode sheet 1 is large. Accordingly, a force for floating the electrode sheet 1 by air ejected from the first air ejection portion 32 becomes weak. When the first air ejection portion 32 is located at a position within 15 degrees upstream in the conveyance direction from the upper vertex of the convex curve 31, resistance to generation of a negative pressure and a force for floating the electrode sheet 1 by air ejected from the first air ejection portion 32 are well balanced, and a force for floating the electrode sheet 1 can be kept large.

One preferred embodiment of the sheet conveying apparatus proposed here has been described above. The preferred embodiments above, however, is merely an example, and the present disclosure can be carried out in other modes. The preferred embodiment described above does not limit to the present disclosure unless otherwise specified. The technique disclosed here can be modified in various ways. The constituent elements and the processes described here can be appropriately omitted or appropriately combined unless no particular problems arise.

For example, the sheet conveying apparatus is not limited to the apparatus that conveys the electrode sheet of the battery, and may be an apparatus that conveys another band-shaped sheet. For example, the convex curve including the first air ejection portion may be a semicircle or an arc shape that does not fill a semicircle, and the upstream end region is not limited to an upstream side of an upper vertex of an arc. The shape of the first air ejection portion is not limited to a slit. The first air ejection portion may be configured such that a plurality of holes are arranged in the width direction of the sheet, for example. It is sufficient that the first conveying portion conveys a sheet with the coated portion facing downward, and the first conveying portion may convey the sheet in a direction other than the horizontal direction. It is also sufficient that the second conveying portion conveys a sheet with the coated portion facing upward, and the second conveying portion may convey the sheet in a direction other than the horizontal direction.

In addition, for example, the sheet conveying apparatus may not be configured to make flotation of the first air ejection portion larger than flotation of the second air ejection portion. When emission of air ejected from the second air ejection portion onto the first conveying portion is inhibited by air ejected from the first air ejection portion, a decrease in pressure between the electrode sheet and the turning portion can be suppressed. This can reduce the possibility of contact of the electrode sheet with the turning portion.

The specification includes the disclosures described in the following items.

Item 1

A sheet conveying apparatus including:

a first conveying portion in which a band-shaped sheet including a first surface and a second surface on an opposite side of the first surface is conveyed with the first surface facing downward;

a turning portion located downstream of the first conveying portion and configured to flip the sheet with the first surface facing inward such that the second surface is located below the first surface; and a second conveying portion located downstream of the turning portion and configured to convey the sheet with the second surface facing downward, wherein the first conveying portion includes an air nozzle that ejects air toward the first surface of the sheet, and the sheet being allowed to float by the ejected air, the turning portion includes a convex curve along which the sheet is flipped, the convex curve includes a first air ejection portion and a second air ejection portion, the first air ejection portion being located in an upstream end region of the convex curve and configured to eject air toward the first surface of the sheet, the second air ejection portion being located downstream of the upstream end region of the convex curve and configured to eject air toward the first surface of the sheet, and the first air ejection portion ejects air to generate flotation larger than that of the second air ejection portion.

Item 2

The sheet conveying apparatus of item 1, wherein
the first air ejection portion includes a slit disposed in the convex curve and extending in a width direction of the sheet, and
the second air ejection portion includes a plurality of air ejection holes disposed in the convex curve.

Item 3

The sheet conveying apparatus of item 2, wherein a length of the slit in the width direction is larger than a length of the sheet in the width direction.

Item 4

The sheet conveying apparatus of item 2 or 3, wherein the turning portion includes
an internal space communicating with the slit and the air ejection holes,
an air inlet through which air is introduced into the internal space, and
a straightening vane disposed in the internal space and configured to guide air such that the air flows toward the slit.

Item 5

The sheet conveying apparatus of item 4, wherein an end portion of the straightening vane near the slit is tilted to a downstream side in a conveyance direction of the sheet with respect to a vertical direction.

Item 6

The sheet conveying apparatus of any one of items 2 to 5, wherein a width of the slit in a conveyance direction of the sheet is larger in a center portion of the slit than in an end portion of the slit in the width direction.

Item 7

The sheet conveying apparatus of any one of items 2 to 6, wherein a width of the slit in a conveyance direction of the sheet is 2 mm or less.

Item 8

The sheet conveying apparatus of any one of items 1 to 7, wherein
the convex curve has an arc shape in a cross section and extends from an upper vertex of the convex curve to an upstream side in a conveyance direction of the sheet, and
the first air ejection portion is located upstream in the conveyance direction from the upper vertex of the convex curve.

Item 9

The sheet conveying apparatus of item 8, wherein the first air ejection portion is located at a position within 15 degrees upstream in the conveyance direction from the upper vertex of the convex curve.

Item 10

The sheet conveying apparatus of any one of items 1 to 9, wherein
the sheet is an electrode sheet of a battery, and
the first surface is coated with a coating material including an active material.

What is claimed is:

1. A sheet conveying apparatus comprising:
a first conveying portion in which a band-shaped sheet including a first surface and a second surface on an opposite side of the first surface is conveyed with the first surface facing downward;
a turning portion located downstream of the first conveying portion and configured to flip the sheet with the first surface facing inward such that the second surface is located below the first surface; and
a second conveying portion located downstream of the turning portion and configured to convey the sheet with the second surface facing downward, wherein
the first conveying portion includes an air nozzle that ejects air toward the first surface of the sheet, and the sheet being allowed to float by the ejected air,
the turning portion includes a convex curve along which the sheet is flipped,
the convex curve includes a first air ejection portion and a second air ejection portion, the first air ejection portion being located in an upstream end region of the convex curve and configured to eject air toward the first surface of the sheet, the second air ejection portion being located downstream of the upstream end region of the convex curve and configured to eject air toward the first surface of the sheet, and
the first air ejection portion ejects air to generate flotation larger than that of the second air ejection portion, wherein
the convex curve has an arc shape in a cross section and extends from an upper vertex of the convex curve to an upstream side in a conveyance direction of the sheet, and
a slit of the first air ejection portion is located upstream in the conveyance direction from the upper vertex of the convex curve, wherein the slit ejects air toward the sheet.

2. The sheet conveying apparatus according to claim 1, wherein
the first air ejection portion includes the slit extending in a width direction of the sheet, and
the second air ejection portion includes a plurality of air ejection holes disposed in the convex curve.

3. The sheet conveying apparatus according to claim 2, wherein a length of the slit in the width direction is larger than a length of the sheet in the width direction.

4. The sheet conveying apparatus according to claim 2, wherein
the turning portion includes
an internal space communicating with the slit and the air ejection holes,
an air inlet through which air is introduced into the internal space, and
a straightening vane disposed in the internal space and configured to guide air such that the air flows toward the slit.

5. The sheet conveying apparatus according to claim 4, wherein an end portion of the straightening vane near the slit is tilted to a downstream side in a conveyance direction of the sheet with respect to a vertical direction.

6. The sheet conveying apparatus according to claim 2, wherein a width of the slit in a conveyance direction of the sheet is larger in a center portion of the slit than in an end portion of the slit in the width direction.

7. The sheet conveying apparatus according to claim 2, wherein a width of the slit in a conveyance direction of the sheet is 2 mm or less.

8. The sheet conveying apparatus according to claim 1, wherein the first air ejection portion is located at a position within 15 degrees upstream in the conveyance direction from the upper vertex of the convex curve.

9. The sheet conveying apparatus according to claim 1, wherein
the sheet is an electrode sheet of a battery, and
the first surface is coated with a coating material including an active material.

10. A sheet conveying apparatus comprising:
a first conveying portion in which a band-shaped sheet including a first surface and a second surface on an opposite side of the first surface is conveyed with the first surface facing downward;
a turning portion located downstream of the first conveying portion and configured to flip the sheet with the first surface facing inward such that the second surface is located below the first surface; and
a second conveying portion located downstream of the turning portion and configured to convey the sheet with the second surface facing downward, wherein
the first conveying portion includes an air nozzle that ejects air toward the first surface of the sheet, and the sheet being allowed to float by the ejected air,
the turning portion includes a convex curve along which the sheet is flipped,
the convex curve includes a first air ejection portion and a second air ejection portion, the first air ejection portion being located in an upstream end region of the convex curve and configured to eject air toward the first surface of the sheet, the second air ejection portion being located downstream of the upstream end region of the convex curve and configured to eject air toward the first surface of the sheet, and
the first air ejection portion ejects air to generate flotation larger than that of the second air ejection portion, wherein
the first air ejection portion includes a slit disposed in the convex curve and extending in a width direction of the sheet, and
the second air ejection portion includes a plurality of air ejection holes disposed in the convex curve, and
a width of the slit in a conveyance direction of the sheet is larger in a center portion of the slit than in an end portion of the slit in the width direction.

* * * * *